United States Patent
Baker et al.

(10) Patent No.: US 8,398,164 B2
(45) Date of Patent: Mar. 19, 2013

(54) SEAT FLAP FOR A VEHICLE SEAT

(75) Inventors: Jason Miles Baker, Pell City, AL (US);
Todd Alan Morris, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 301 days.

(21) Appl. No.: 12/871,657

(22) Filed: Aug. 30, 2010

(65) Prior Publication Data
US 2012/0049588 A1 Mar. 1, 2012

(51) Int. Cl.
*B60N 2/32* (2006.01)

(52) U.S. Cl. ............ 297/15; 297/188.1; 297/66; 40/593

(58) Field of Classification Search .................... 297/15, 297/188.1, 188.09, 188.08; 296/65, 69, 65.05; 40/593
See application file for complete search history.

(56) References Cited

U.S. PATENT DOCUMENTS

| | | | |
|---|---|---|---|
| 3,246,924 A | | 4/1966 | Krueger et al. |
| 3,975,849 A | * | 8/1976 | Tuleja ............................. 40/583 |
| 4,443,034 A | * | 4/1984 | Beggs ........................ 296/65.17 |
| 4,979,772 A | | 12/1990 | Carey et al. |
| 5,031,347 A | * | 7/1991 | Berg ............................... 40/591 |
| 5,156,274 A | * | 10/1992 | Williams et al. ............... 206/573 |
| 5,573,288 A | * | 11/1996 | Raffensperger .......... 297/188.12 |
| 5,887,942 A | * | 3/1999 | Allegro, Jr. .............. 297/188.12 |
| 5,927,800 A | * | 7/1999 | Stallworth ............... 297/188.08 |
| 5,971,467 A | | 10/1999 | Kayumi et al. |
| 6,053,570 A | * | 4/2000 | Stern et al. ............... 297/188.08 |
| 6,082,816 A | * | 7/2000 | Gottlieb et al. ............ 297/188.1 |
| 6,161,896 A | * | 12/2000 | Johnson et al. ............ 297/188.1 |
| 6,199,803 B1 | * | 3/2001 | Schafer ............................ 248/99 |
| 6,416,107 B1 | * | 7/2002 | Kanaguchi et al. ........ 296/65.09 |
| 6,623,061 B2 | | 9/2003 | Tourangeau et al. |
| 6,648,395 B2 | | 11/2003 | Hoshino |
| 6,793,265 B2 | * | 9/2004 | Kamida et al. .................. 296/64 |
| 6,817,660 B2 | | 11/2004 | Ito et al. |
| 6,918,625 B2 | | 7/2005 | Storto et al. |
| 6,971,716 B2 | | 12/2005 | DePaulis et al. |
| 6,981,730 B2 | * | 1/2006 | Bixby ........................ 296/37.15 |

(Continued)

FOREIGN PATENT DOCUMENTS

| | | | |
|---|---|---|---|
| DE | 19901511 | * | 7/2000 |
| GB | 2079700 A | * | 1/1982 |

(Continued)

OTHER PUBLICATIONS

U.S. Appl. No. 12/871,653, filed Aug. 30, 2010 and entitled "Seat Flap for a Vehicle Seat".

(Continued)

*Primary Examiner* — David Dunn
*Assistant Examiner* — David E Allred
(74) *Attorney, Agent, or Firm* — Rankin Hill & Clark LLP

(57) ABSTRACT

A fold and tumble vehicle seat assembly includes a seat cushion having an underside that forms a floor surface when the seat cushion is rotated to a stowed position, and a seat flap attached to the seat cushion for bridging a gap formed between the seat cushion and an adjacent vehicle floor surface when the seat cushion is in the stowed position. The seat flap has an outer sleeve formed of a first material and an insert received in the sleeve formed of a second material.

20 Claims, 7 Drawing Sheets

U.S. PATENT DOCUMENTS

| | | | |
|---|---|---|---|
| 7,152,900 B2 * | 12/2006 | Trombley et al. | 296/65.09 |
| 7,422,047 B1 * | 9/2008 | McDonald | 160/229.1 |
| 7,628,438 B2 * | 12/2009 | Partch | 296/24.46 |
| 7,798,569 B2 * | 9/2010 | Comarella | 297/188.2 |
| 7,819,468 B2 * | 10/2010 | Tsuda et al. | 297/188.1 |
| 2001/0002759 A1 * | 6/2001 | Nishide | 296/65.09 |
| 2003/0184130 A1 * | 10/2003 | Kutomi et al. | 297/15 |
| 2003/0196361 A1 * | 10/2003 | Wang | 40/610 |
| 2005/0134076 A1 * | 6/2005 | Storto et al. | 296/66 |
| 2005/0237173 A1 | 10/2005 | Huang | |
| 2006/0006705 A1 * | 1/2006 | Charbonneau | 297/188.08 |
| 2009/0072595 A1 * | 3/2009 | Tsuda et al. | 297/188.1 |
| 2012/0299338 A1 * | 11/2012 | Hanson et al. | 297/183.1 |

FOREIGN PATENT DOCUMENTS

| | | |
|---|---|---|
| JP | 2004345487 | 12/2004 |
| JP | 2008207636 | 9/2008 |

OTHER PUBLICATIONS

U.S. Office Action, U.S. Appl. No. 12/871,653, dated Dec. 18, 2012, 17 pages.

* cited by examiner

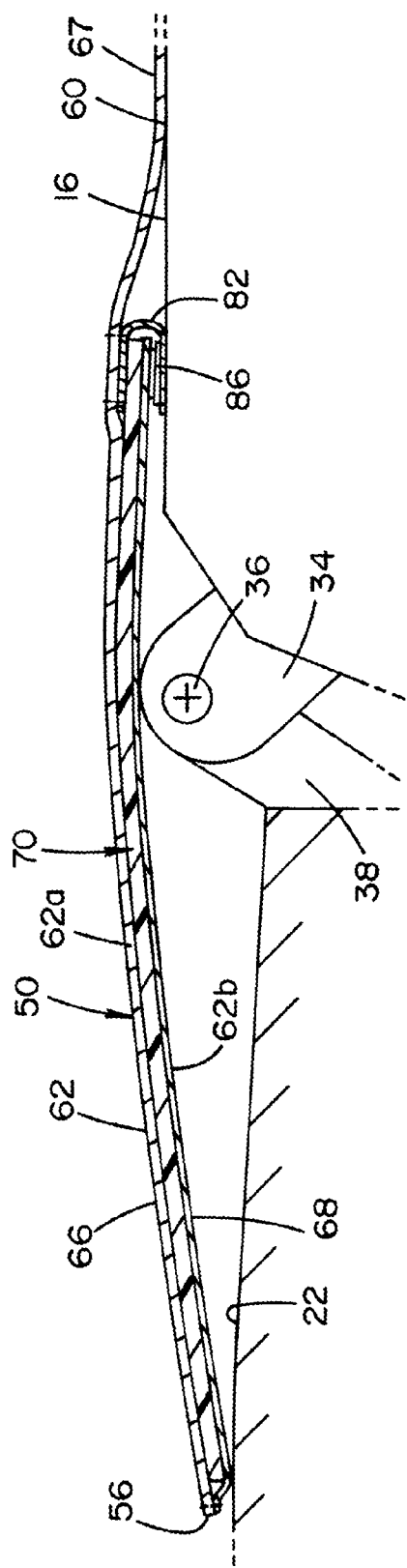
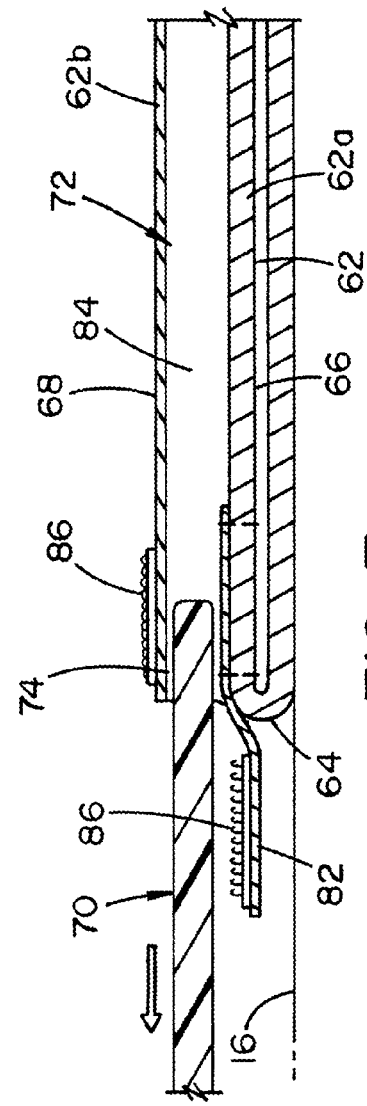
FIG. 6
FIG. 7

SEAT FLAP FOR A VEHICLE SEAT

BACKGROUND

The subject disclosure relates to vehicle seats, and more particularly relates to a sleeve or pocket construction for a seat flap on a vehicle seat.

One known vehicle seat is a fold and tumble vehicle seat that is movable from an occupant position to a stowed position. In particular, a seat back of the vehicle seat can be folded onto the seat cushion and the seat cushion can be flipped or rotated (i.e., tumbled) about a horizontal axis to the stowed position where an underside of the seat cushion forms an upwardly facing surface. Optionally, the vehicle seat can be tumbled into a recess defined in the vehicle floor and the underside surface can be flush with an adjacent surface (e.g., cargo floor).

One issue with these types of seats is that a gap can be formed between the inverted seat cushion and the adjacent floor surface. The gap can be unsightly and function undesirably as a crevice into which loose items can fall and not be easily retrieved without returning the vehicle seat to the occupant position. To deal with the gap, a seat flap is sometimes attached to an underside of the seat cushion. The seat flap covers the gap by bridging from the underside of the seat cushion to the adjacent vehicle floor surface. Thus, the flap spans over the gap hiding the gap and preventing objects from falling into the gap.

A typical construction for the seat flap includes providing a rigid member (e.g., plastic or pressboard) that is wrapped, glued and stapled by a fabric covering. One problem with this arrangement is that it is difficult to assemble with a one-piece appearance and difficult to maintain a low profile for the seat flap.

SUMMARY

According to one aspect, a fold and tumble vehicle seat assembly includes a seat cushion having an underside that forms a floor surface when the seat cushion is rotated to a stowed position, and a seat flap attached to the seat cushion for bridging a gap formed between the seat cushion and an adjacent vehicle floor surface when the seat cushion is in the stowed position. The seat flap has an outer sleeve formed of a first material and an insert received in the sleeve formed of a second material.

According to another aspect, a seat flap for a vehicle seat includes a proximal end portion attached to an underside of a rotatable seat cushion and a distal end portion depending from the underside of the rotatable seat cushion. The distal end portion defines a pocket for receiving a rigid insert therein.

According to still another aspect, a fold and tumble vehicle seat assembly includes a seat cushion rotatable to a stowed position wherein an underside of the seat cushion is flipped over. The vehicle seat assembly further includes a seat flap connected to the underside of the seat cushion so as to depend therefrom when the seat cushion is in an occupant position and to extend from the underside to a vehicle floor surface when the seat cushion is in a stowed position to bridge a gap defined between the seat cushion and the vehicle floor surface. The seat flap has an outer sleeve defining a pocket and an insert removably received in the pocket.

BRIEF DESCRIPTION OF THE DRAWINGS

FIG. 6 is a partial cross-sectional view of the seat flap bridging the gap defined between the underside of the seat cushion and the adjacent vehicle floor surface.

FIG. 7 is a partial cross-sectional view of the seat flap folded over and having the insert being removed from the pocket of the seat flap.

DETAILED DESCRIPTION

Figure 1:
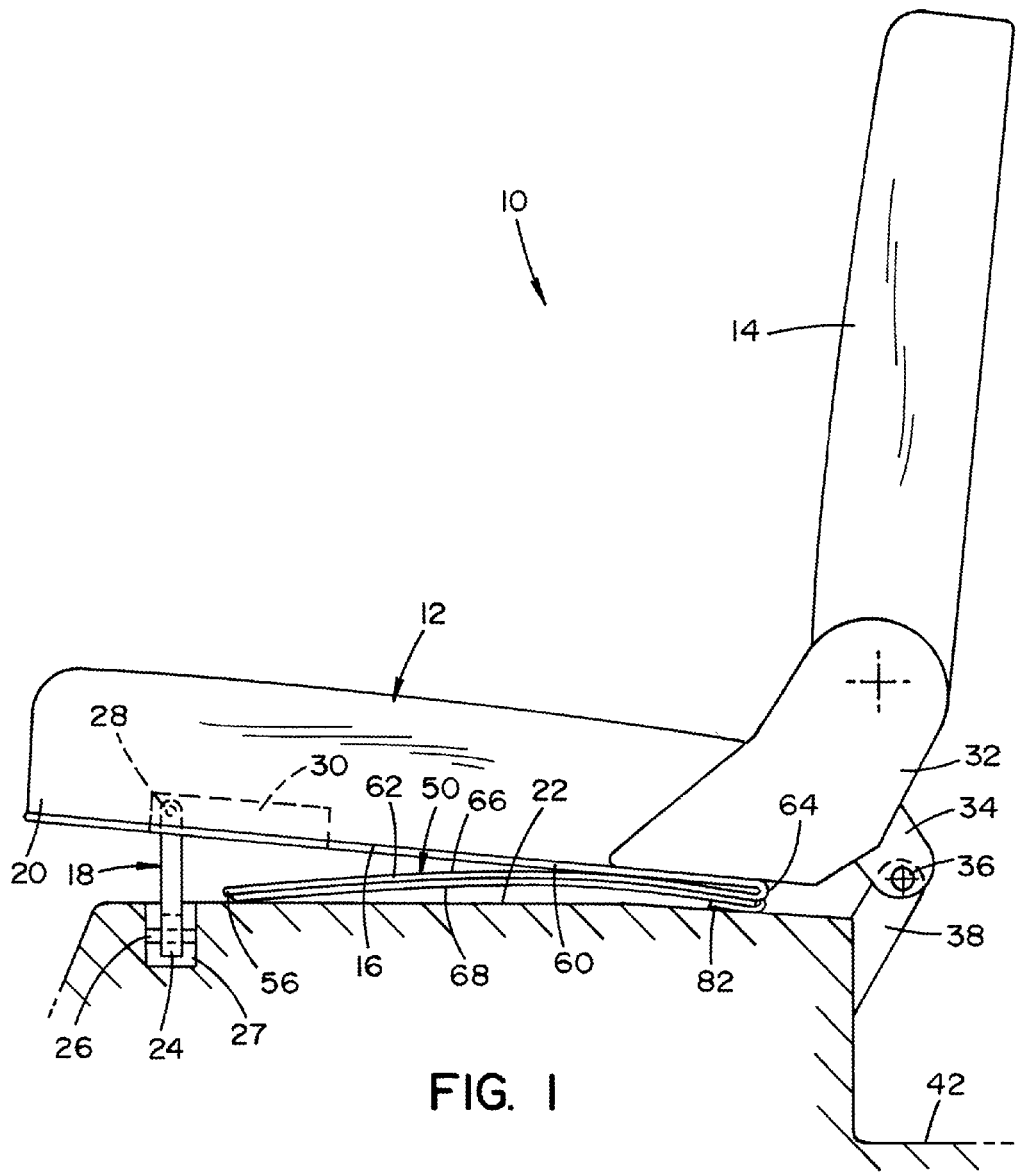
FIG. 1 is a schematic side elevational view of a fold and tumble seat in an occupant position.

Referring now to the drawings, wherein the showings are for purposes of illustrating one or more exemplary embodiments and not for purposes of limiting same, FIG. 1 illustrates a fold and tumble vehicle seat or seat assembly generally designated by reference numeral 10. The vehicle seat 10 includes a seat cushion 12 and a seat back 14 pivotally connected thereto. In FIG. 1, the vehicle seat 10 is shown in an occupant position wherein the seat back 14 extends upwardly from the seat cushion to allow an occupant to sit in the vehicle seat 10. As will be described in more detail below, the seat cushion 12 is rotatable to a stowed position wherein an underside 16 of the seat cushion 12 is flipped over.

In the illustrated embodiment, the seat cushion 12 has a leg member 18 disposed adjacent a forward portion 20 of the seat cushion 12 for securing the seat cushion 12 in a slightly elevated position relative to a vehicle floor surface 22 disposed below the seat cushion 12 when in its occupant position. The leg member 18 is removably connected to the vehicle floor surface 22, which can be a carpeted floor surface. More particularly, in the illustrated embodiment, a distal end 24 of the leg member 18 can be latched onto a striker or other attaching device 26 connected or provided on the vehicle floor surface 22 (e.g., disposed in recess 27 defined in the floor surface 22). The leg member 18 can have a proximal end 28 opposite the distal end 24 that is pivotally connected to the seat cushion 12. In the illustrated embodiment, the proximal end 28 can be pivotally connected to the seat cushion 12 within a recess 30 defined in the underside 16 of the seat cushion 12, the recess 30 accommodating the leg member when folded therein. With brief reference to FIG. 3, the leg member 18 is shown accommodated or received within the recess 30. As shown, the leg member 18 in the illustrated embodiment has a latch 31 disposed adjacent the distal end 24 for selectively latching onto the striker 26.

With reference back to FIG. 1, the seat cushion 12 can also be pivotally or rotatably connected to the floor surface 22 adjacent a rear portion 32. More particularly, in the illustrated embodiment arms 34 secured to the seat cushion 12 are rotatably connected via pivot pins 36 to arms 38 attached to the vehicle floor surface 22. This arrangement allows the seat cushion 12 to be rotatable and flipped over (i.e., tumbled) to the stowed position. Of course, it should be appreciated by those skilled in the art that the seat 10 is merely illustrated and that other seat types and seat constructions are to be considered within the scope of the present disclosure.

Figure 2:
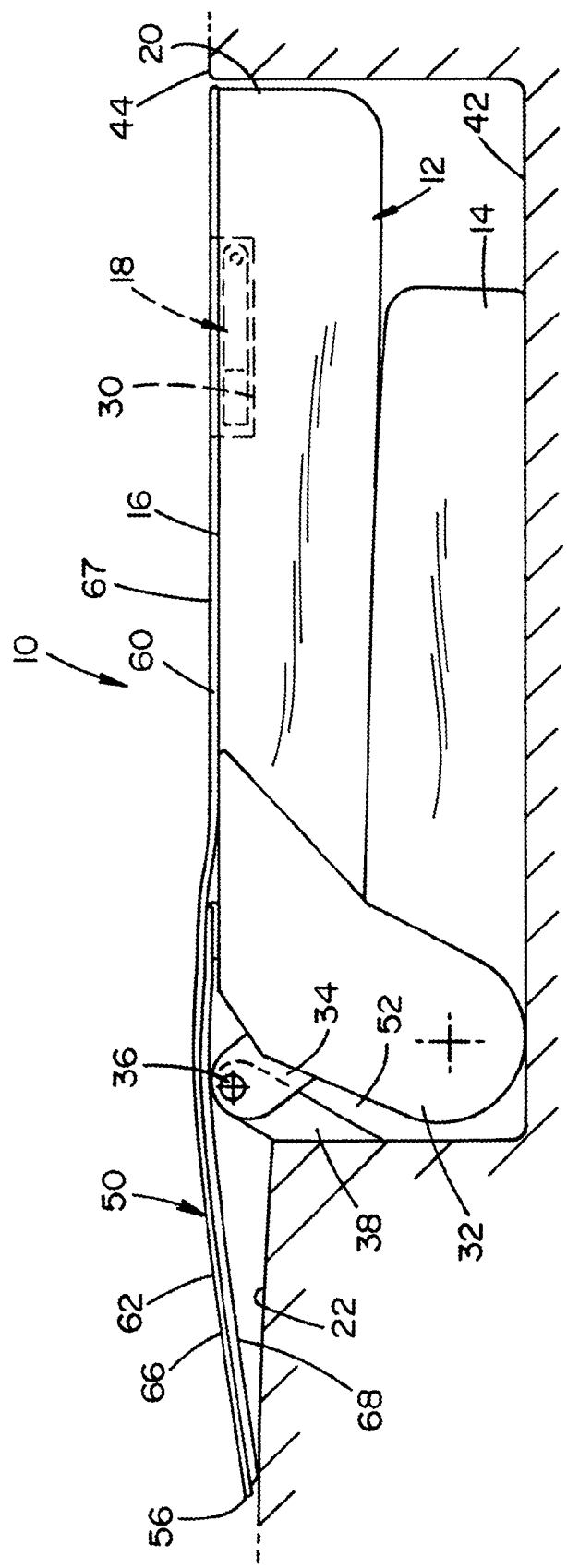
FIG. 2 is a schematic side elevational view of the fold and tumble vehicle seat in a stowed position.

With additional reference to FIG. 2, the seat back 14 can be folded onto the seat cushion 12 (counterclockwise in FIG. 1) to move the vehicle seat 10, and particularly the seat cushion 12, to the stowed position. To flip over the seat cushion 12, the leg member 18 is disconnected from the striker 26 and can be pivoted into the recess 30. The seat cushion 12 can then be rotated about the pivot pin 36 (clockwise in FIG. 1) such that the underside 16 of the seat cushion 12 is flipped over to form a floor surface when the seat cushion 12 is fully rotated to the stowed position. In the illustrated embodiment, a recess 42 is formed in the floor surface 22 for accommodating the vehicle seat 10 in its stowed position. In particular, receipt of the vehicle seat 10 in the recess 42 allows the floor surface 16 to be at approximately zero degrees and/or substantially parallel or coplanar with an adjacent vehicle floor surface 44.

As shown, a seat flap 50 is connected or attached to the underside 16 of the seat cushion 16 for bridging a gap 52 formed between the seat cushion 12 and the adjacent vehicle floor surface 22 when the seat cushion 12 is in the stowed position (FIG. 2). More particularly, the seat flap 50 depends from the underside 16 of the seat cushion 12 when the seat cushion 12 is in the occupant position (FIG. 1). The seat flap 50 slides along the floor surface 22 as the seat cushion 12 is rotated to the stowed position from the occupant position. The seat flap 50 extends from the underside 16 of the seat cushion 12 to the vehicle floor surface 22 when the seat cushion is in the stowed position to bridge the gap 52 defined between the seat cushion 12 and the vehicle floor surface 22 (FIG. 2). The seat flap 50 again slides along the vehicle floor 22 as the seat cushion is rotated back to the occupant position from the stowed position.

Figure 3:
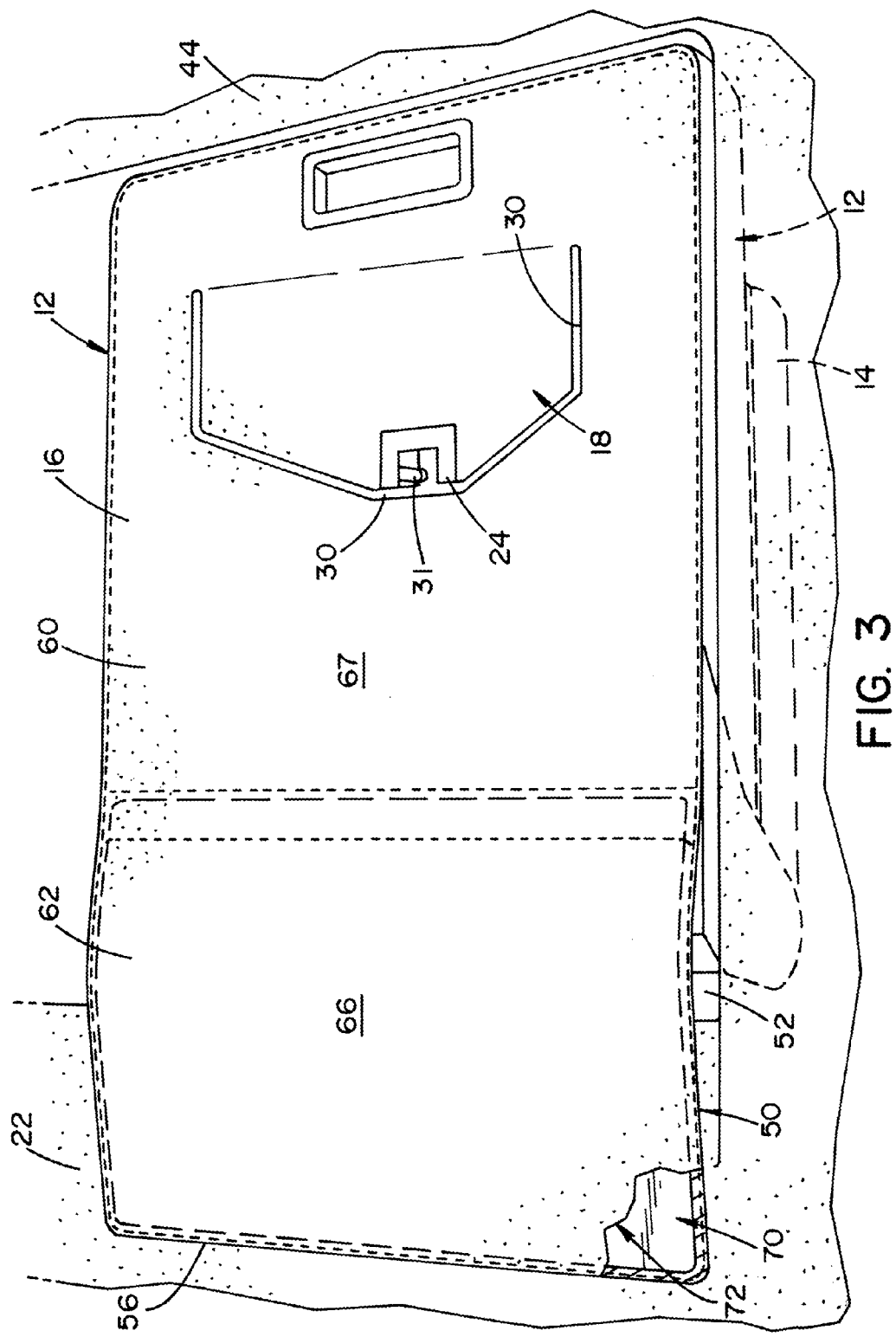
FIG. 3 is a top perspective view of the fold and tumble vehicle seat in the stowed position shown with the seat flap bridging a gap between an underside of the seat cushion and an adjacent vehicle floor surface.

In the illustrated embodiment, the seat flap 50 includes a proximal end portion 60 attached to the underside 16 of the rotatable seat cushion and a distal end portion 62 depending from the underside 16 of the seat cushion 12. A fold 64 is disposed between the proximal end portion 60 and the distal end portion 62. As shown in FIGS. 2 and 3, the distal end portion 62 covers the gap 52. The proximal end portion 60 covers substantially an entirety of the underside 16 of the rotatable seat cushion 12. A distal end 56 of the seat flap 50, and particularly of the distal end portion 62, contacts the floor surface 22 and slides thereon when the seat cushion 12 is moved between the occupant position and the stowed position.

More specifically, the seat flap 50 has the proximal end portion 60 secured to the underside 16 of the seat cushion 12 and the fold 64 interposed between the proximal end portion 60 and the distal end portion 62, and also the distal end 56, such that the distal end 56 is folded against or toward the proximal end portion 60 when the seat cushion is in the occupant position of FIG. 1 and unfolded therefrom when the seat cushion 12 is in the stowed position of FIG. 2. As shown, the fold 64 is adjacent the underside 16 of the seat cushion 12 and the distal end 56 is spaced apart from the fold 64. The adjacent vehicle floor surface 22 is disposed under the seat cushion 12 when the seat cushion 12 is in the occupant position of FIG. 1 and has the distal end 56 of the seat flap 50 moving therealong when the seat cushion is moved between the occupant position of FIG. 1 and the stowed position of FIG. 2.

Figure 4:
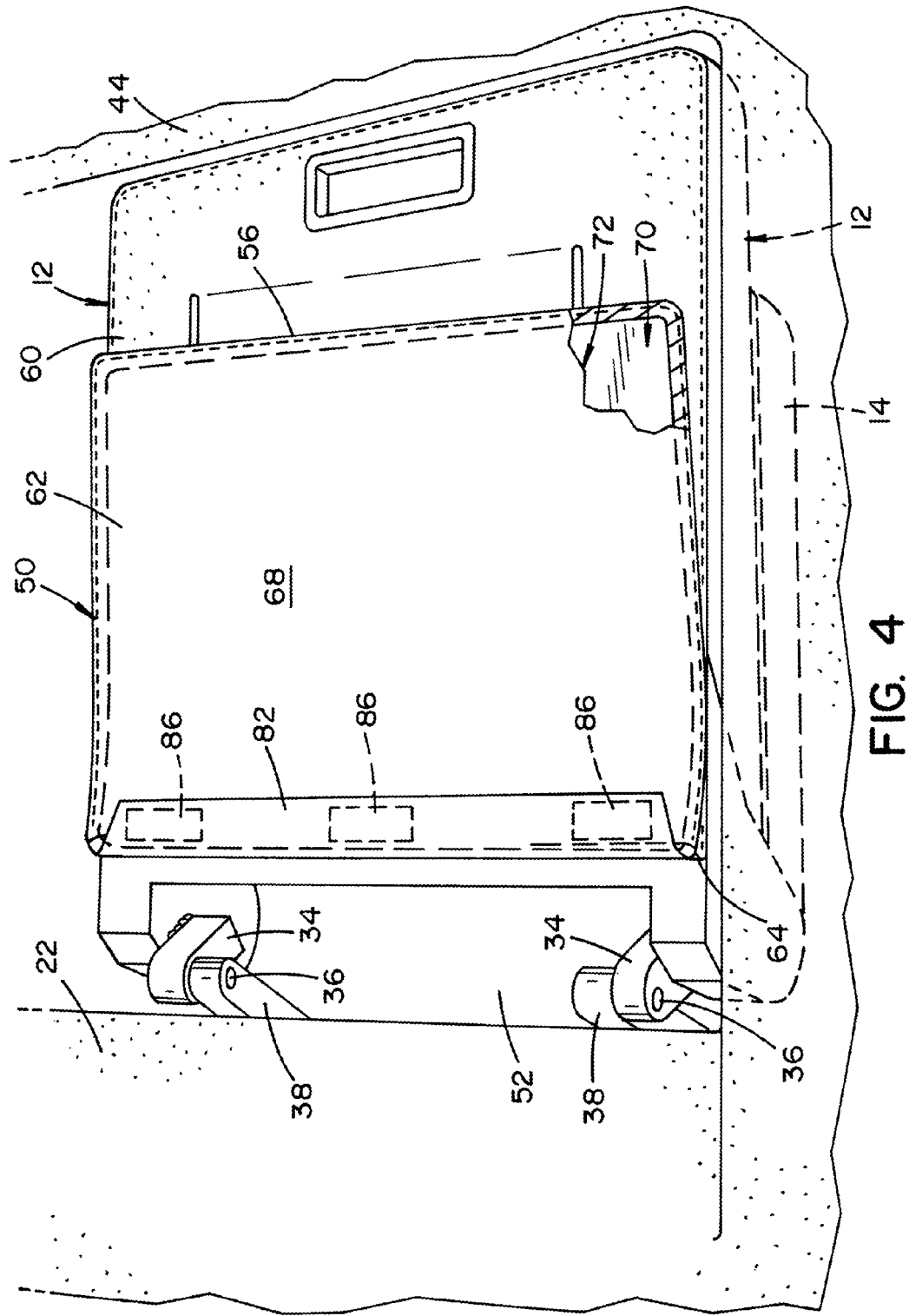
FIG. 4 is a view similar to FIG. 3, but shown with the seat flap folded back onto the underside of the seat cushion.

The distal end portion 62 can include a first surface 66 facing the underside 66 of the seat cushion 12 when the seat cushion 12 is in the occupant position of FIG. 1 and a second, opposite surface 68 facing the floor surface 22. As shown in FIG. 3, the first or show surface 66 faces upwardly along with a show surface 67 of the proximal end portion 60 when the seat cushion 12 is in the stowed position of FIG. 2. With reference to FIG. 4, the distal end portion 62 is shown folded at fold 64 back onto the proximal end portion 60 such that surface 68 is shown facing upwardly and gap 52 is exposed.

Figure 5:
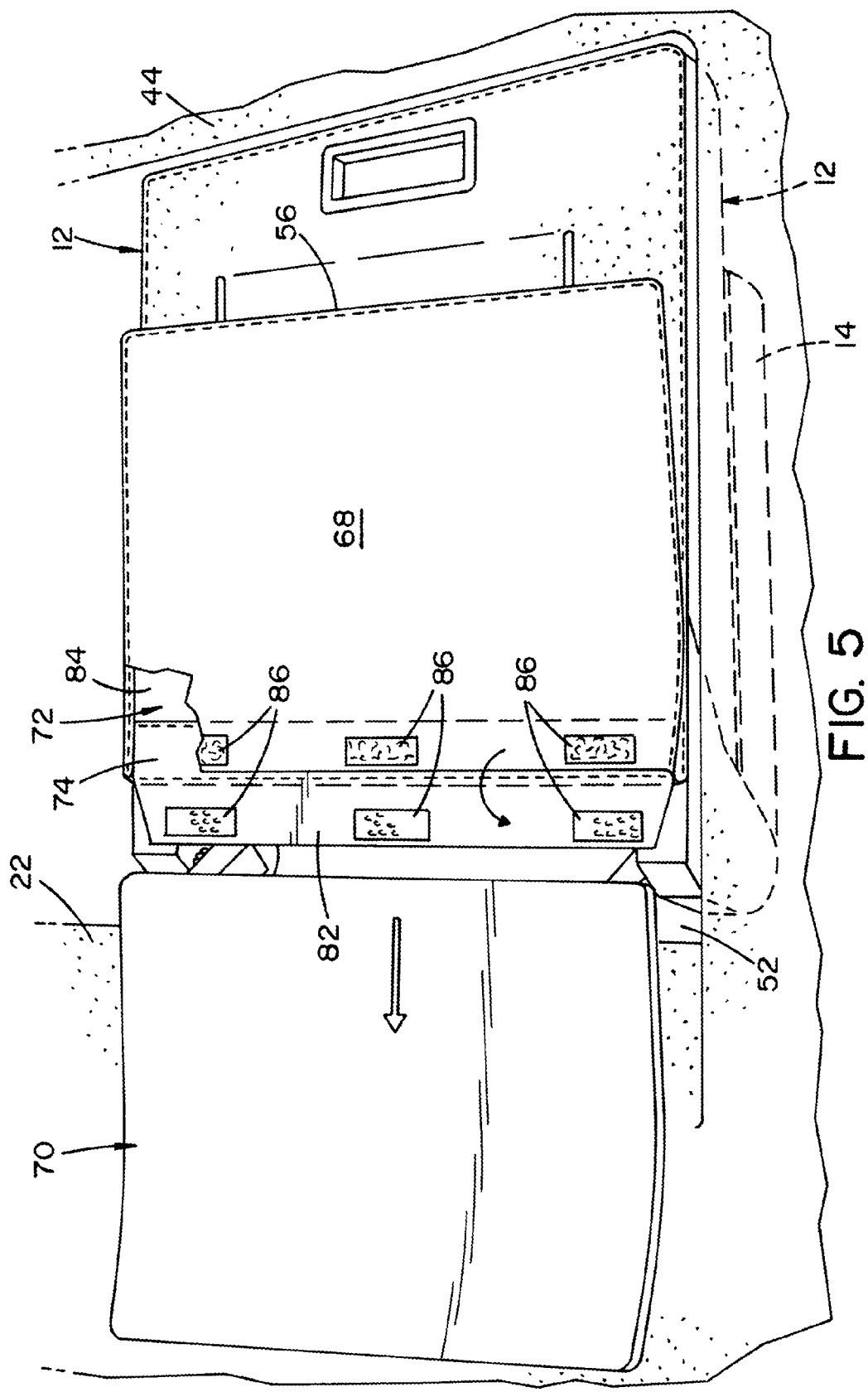
FIG. 5 is a view similar to FIG. 4, but shown with an insert being removed from a pocket of the seat flap.

With additional reference to FIGS. 5-7, the seat flap 50 can include an insert 70 and an outer sleeve 72 with the insert 70 received in outer sleeve 72. The outer sleeve 72 can be formed of a first material and the insert 70 can be formed of a second material. More particularly, the seat flap 50, and particularly the distal end portion 62 of the seat flap 50, can have the outer sleeve 72 defining a pocket 84 and the insert 70 can be removably received in the pocket 84. The first material forming the seat flap 50 can be relatively soft while the second material forming the insert 70 can be relatively rigid. For example, the first material can be a fabric or upholstery material and the second material can be a plastic, such as a relatively rigid plastic.

The first surface 66 can be provided on a first layer 62a of the distal end portion 62 and the second surface 68 can be provided on a second layer 62b of the distal end portion 62. The layers 62a, 62b together define the pocket 84 (FIG. 7). The insert 70 can have a generally rectangular and planar configuration. Accordingly, the outer sleeve 72 and the pocket 84 formed by the distal end portion 62 are such that the insert 70 adds rigidity to the distal end portion 62.

For removing the insert 70 from the sleeve 72 and particularly the pocket 84 thereof, the distal end portion 62 defines an opening 74. The opening 74 to the pocket 84 can be defined across a lateral width of the distal end portion 62 as best shown in FIG. 5. The opening 74 can be disposed adjacent the fold 64. The opening 74 to the pocket 84 is defined on an underside surface of the distal end portion 62 that is opposite the show surface of the distal end portion 62. A flap 82 can be provided for closing the sleeve 72 (and the pocket 84) and preventing the insert 70 from moving relative to the sleeve 72. As shown, the flap 82 is disposed adjacent the opening 74 for folding over the opening 74 to close the opening 74 when the insert 70 is received in the pocket 84. A fastener, such as a hook and loop fastener 86 or a plurality of such fasteners 86, can be provided for selectively closing the flap 82 and securing it in its closed position. To close the pocket 84.

By this arrangement, a continuous fabric layer defines a show surface 66, 67 on both the proximal end portion 60 and the distal end portion 62. In particular, having the outer sleeve 72 formed of a flexible fabric material and the insert 70 formed of a rigid material (e.g., plastic) allows for a continuous piece, such as a fabric piece, to extend along substantially an entirety of the underside 16 of the seat cushion 12 and across the gap 52. This improves appearance by providing a "one piece look" and also improves the installation process (e.g., allows the rigid insert 70 to be installed separate from the trim cover while maintaining the one piece look). Additionally, serviceability improves in that the rigid insert 70 can be easily replaced if it is damages without the need to replace the entire seat flap 50.

Figure 8:
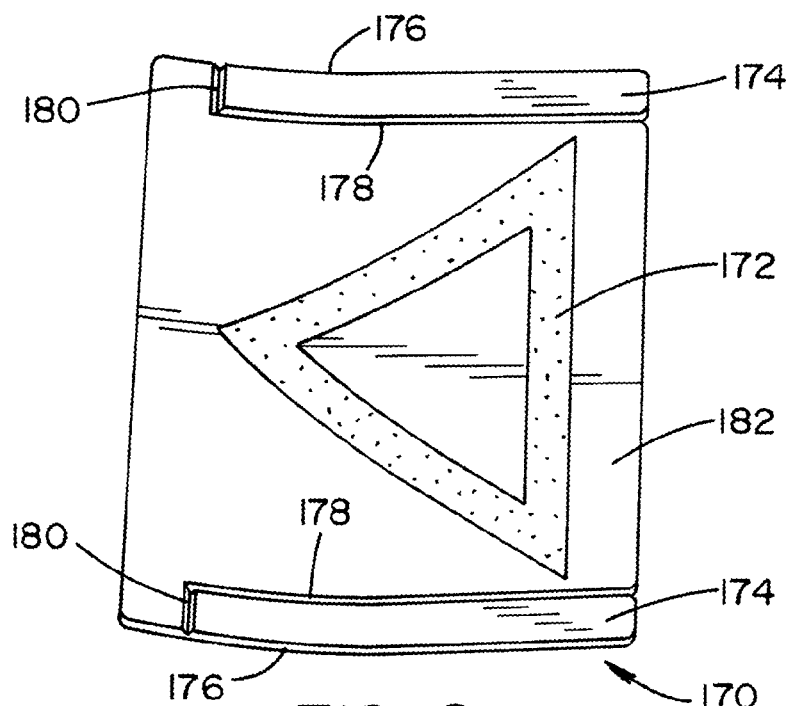
FIG. 8 is a plan view of an insert configured as a stand-up deflector.
Figure 9:
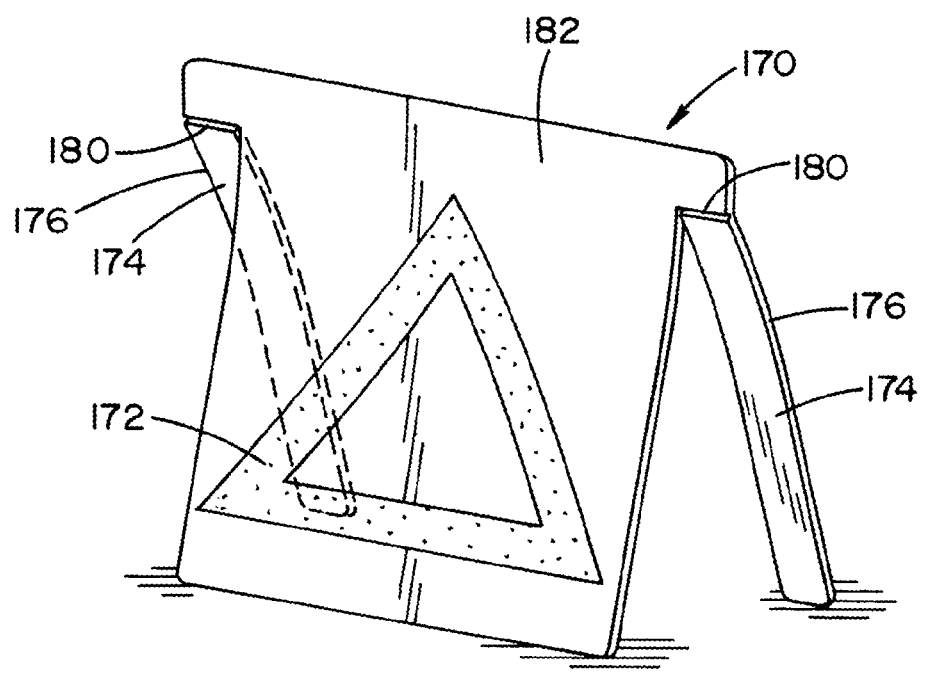
FIG. 9 is a perspective view of the insert of FIG. 8.

Further, having the insert 70 removable from the pocket 84 allows for features to be added to the insert for improved customer satisfaction. For example, with reference to FIGS. 8 and 9, an insert 170 is shown according to an alternative embodiment. The insert 170 can be substituted for the insert 70 in the vehicle seat assembly 10, if desired. As shown, the insert 170 can include a reflective layer or surface 172 so that the insert 170 can be removed from its pocket (e.g., pocket 84) and used as a reflector. In the embodiment illustrated, the reflective layer 172 is in the shape of a triangle so as to be readily recognizable as a roadside reflector. In addition, the insert 172 can include pop-out legs 174 for supporting the insert 172 in an upright position when removed from the insert's seat flap pocket. In the illustrated embodiment, the legs 174 are disposed along lateral side edges 176 of the insert 170 and are defined by cut sections or slits 178. Scored sections 180 can allow the legs 174 to pivot relative to main portion 182 on which the reflective layer 172 is provided so that the insert 172 can be situated in the upright position illustrated in FIG. 9. In another example, the insert can have a message written thereon (e.g., "HELP") and could be placed in a window of the vehicle in the event help is needed (e.g., during a roadside breakdown). These and other features can be added to the removable insert 70.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A fold and tumble vehicle seat assembly, comprising:
   a seat cushion having an underside that forms a floor surface when said seat cushion is rotated to a stowed position; and
   a seat flap attached to said seat cushion for bridging a gap formed between said seat cushion and an adjacent vehicle floor surface when said seat cushion is in said stowed position, said seat flap having an outer sleeve forming a pocket of a first material and a removable insert slidably received in the pocket and formed of a second material.

2. The fold and tumble vehicle seat assembly of claim 1 wherein said first material is relatively soft and said second material is relatively rigid.

3. The fold and tumble vehicle seat assembly of claim 2 wherein said first material is a fabric material and said second material is a plastic.

4. The fold and tumble vehicle seat assembly of claim 1 wherein said outer sleeve forms a pocket in which said insert is removably received.

5. The fold and tumble vehicle seat assembly of claim 4 wherein said insert includes a reflective surface so that the insert can be removed from said pocket and used as a reflector.

6. The fold and tumble vehicle seat assembly of claim 5 wherein said insert includes pop-out legs for supporting said insert in an upright position when removed from said pocket.

7. The fold and tumble vehicle seat assembly of claim 1 wherein said seat flap has a proximal end portion secured to said underside of said seat cushion and a distal end portion depending from said underside of said seat cushion, said seat flap further including a fold disposed between said proximal end portion and said distal end portion, said outer sleeve and said pocket formed by said distal end portion such that said insert adds rigidity to said distal end portion.

8. The fold and tumble vehicle seat assembly of claim 7 wherein said fold is adjacent said underside of said seat cushion and a distal end of said distal end portion is spaced apart from said fold for moving along an adjacent vehicle floor surface when said seat cushion is moved between an occupant position and a stowed position.

9. The fold and tumble vehicle seat assembly of claim 7 wherein said distal end portion defines an opening to said pocket across a lateral width of said distal end portion.

10. The fold and tumble vehicle seat assembly of claim 9 wherein said insert has a generally rectangular and planar configuration.

11. The fold and tumble vehicle seat assembly of claim 9 wherein said opening is disposed adjacent said fold.

12. The fold and tumble vehicle seat assembly of claim 9 further including a closure flap disposed adjacent said opening for folding over said opening to close said opening when said insert is received in said pocket.

13. The fold and tumble vehicle seat assembly of claim 12 wherein a fastener secures said flap in said closed position over said opening.

14. The fold and tumble vehicle seat assembly of claim 1 wherein said seat cushion is rotatable and said seat flap includes:
   a proximal end portion attached to an underside of a rotatable seat cushion; and
   a distal end portion depending from said underside of said rotatable seat cushion, said distal end portion including said outer sleeve defining said pocket for receiving said insert therein, wherein said insert is a rigid insert.

15. The fold and tumble vehicle seal assembly of claim 14 wherein said proximal end portion covers substantially an entirety of said underside of said rotatable seat cushion.

16. The fold and tumble vehicle seal assembly of claim 15 further including a fold disposed between said proximal end portion and said distal end portion.

17. The fold and tumble vehicle seal assembly of claim 15 wherein a continuous fabric layer defines a show surface of both said proximal end portion and said distal end portion.

18. The fold and tumble vehicle seal assembly of claim 17 wherein an opening to said pocket is defined on an underside surface of said distal end portion that is opposite said show surface of said distal end portion.

19. A fold and tumble vehicle seat assembly, comprising:
   a seat cushion rotatable to a stowed position wherein an underside of said seat cushion is flipped over;
   a seat flap connected to said underside of said seat cushion so as to depend therefrom when said seat cushion is in an occupant position and to extend from said underside to a vehicle floor surface when said seat cushion is in a stowed position to bridge a gap defined between said seat cushion and said vehicle floor surface, said seat flap having an outer sleeve defining a pocket and a rigid material insert removably received in said pocket.

20. The fold and tumble vehicle seat assembly of claim 19 wherein said outer sleeve is formed of a flexible fabric material.

\* \* \* \* \*